United States Patent
Wakita et al.

(10) Patent No.: US 8,497,323 B2
(45) Date of Patent: Jul. 30, 2013

(54) POWDER OF VINYL POLYMER CONTAINING SILICONE POLYMER AND METHOD FOR PRODUCING THE SAME, RESIN COMPOSITION, AND SHAPED ARTICLE

(75) Inventors: Ayaka Wakita, Hiroshima (JP); Toshihiro Kasai, Hiroshima (JP); Kouichi Shishido, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 74 days.

(21) Appl. No.: 13/061,033

(22) PCT Filed: Aug. 27, 2009

(86) PCT No.: PCT/JP2009/064919
§ 371 (c)(1),
(2), (4) Date: Feb. 25, 2011

(87) PCT Pub. No.: WO2010/024311
PCT Pub. Date: Mar. 4, 2010

(65) Prior Publication Data
US 2011/0160401 A1    Jun. 30, 2011

(30) Foreign Application Priority Data

Aug. 29, 2008 (JP) ................. 2008-221994
Oct. 16, 2008 (JP) ................. 2008-267633
Jun. 12, 2009 (JP) ................. 2009-141602

(51) Int. Cl.
*C08L 83/00* (2006.01)
(52) U.S. Cl.
USPC ........................................... 525/100
(58) Field of Classification Search
USPC ............................................... 525/100
See application file for complete search history.

(56) References Cited

U.S. PATENT DOCUMENTS

| | | | |
|---|---|---|---|
| 5,045,595 A * | 9/1991 | Wang | 525/66 |
| 2002/0147271 A1 | 10/2002 | Craig et al. | |
| 2002/0188063 A1 | 12/2002 | Craig et al. | |
| 2007/0219319 A1* | 9/2007 | Saegusa | 525/100 |
| 2007/0225439 A1 | 9/2007 | Hashimoto et al. | |
| 2010/0187965 A1 | 7/2010 | Wakita et al. | |

FOREIGN PATENT DOCUMENTS

| | | |
|---|---|---|
| EP | 0 369 204 A2 | 5/1990 |
| EP | 0 369 204 A3 | 5/1990 |
| EP | 1 746 116 A1 | 1/2007 |
| EP | 1 757 630 A1 | 2/2007 |
| EP | 2 182 016 A1 | 5/2010 |
| JP | 10 182987 | 7/1998 |
| JP | 2002 531654 | 9/2002 |
| JP | 2002 308997 | 10/2002 |
| JP | 2004 346271 | 12/2004 |

OTHER PUBLICATIONS

International Search Report Issued Dec. 8, 2009 in PCT/JP09/064919 filed Aug. 27, 2009.
Extended European Search Report issued on Aug. 4, 2011 in the corresponding European Application No. 09809961.7.

* cited by examiner

*Primary Examiner* — Margaret Moore
(74) *Attorney, Agent, or Firm* — Oblon, Spivak, McClelland, Maier & Neustadt, L.L.P.

(57) ABSTRACT

Disclosed is a method for producing powder of a vinyl polymer containing a silicone polymer, which comprises the step of spray-drying a latex of the vinyl polymer containing a silicone polymer obtained by polymerization of a vinyl monomer in the presence of a latex of the silicone polymer, wherein 3.0 mmol or less of a sulfate is contained in 100 g of the powder of a vinyl polymer containing a silicone polymer. According to the present invention, a powder which can provide a shaped article excellent in impact resistance and hydrolysis resistance in the case when the powder is blended in a resin such as polycarbonate resin can be obtained.

17 Claims, No Drawings

POWDER OF VINYL POLYMER CONTAINING SILICONE POLYMER AND METHOD FOR PRODUCING THE SAME, RESIN COMPOSITION, AND SHAPED ARTICLE

TECHNICAL FIELD

The present invention relates to powder of a vinyl polymer containing a silicone polymer and a method for producing the same, a resin composition containing the aforementioned powder, and a shaped article obtained by shaping of the aforementioned resin composition.

BACKGROUND ART

For the production of powder of a vinyl polymer to be used as a modifier such as impact resistance improver or flame retardant in a blended form with a synthetic resin or an elastomer, a method using a dispersion polymerization in an aqueous medium such as emulsion polymerization is widely used. When emulsion polymerization is used as a method for producing a vinyl polymer, a process for recovering the vinyl polymer as a solid such as powder from an obtained latex of the vinyl polymer is necessary.

As the above-mentioned process, a process of mixing an acid or a salt with the latex to obtain a coagulated slurry followed by heat treatment, dehydration and drying (hereinafter, referred to as "coagulation method") has been widely known. Although this method can be applied to a latex which can be coagulated by an acid or a salt, this method cannot be applied to a latex which is difficult to coagulate such as one in which a nonion surfactant is used.

In addition, in the coagulation method, plural steps such as coagulation, heat treatment, dehydration, and drying are necessary, and the equipment becomes complicated. Further, there is a case where a system for controlling a coordination among the aforementioned plural steps is necessary. Consequently, improvement of a process for recovering powder of a vinyl polymer is desired from the viewpoint of cost of equipment or operation.

In addition, in the coagulation method, a large amount of waste water containing water soluble components derived from components mainly used in the polymerization step and the coagulation step generates in the dehydration step, and an apparatus for the treatment of the waste water is necessary, and thus the total equipment becomes large.

To solve these problems, a method of obtaining powder by spraying a latex of the vinyl polymer from a nozzle while drying it by hot air (hereinafter, referred to as "spray drying method") is widely known. In the spray drying method, coagulation is not needed, so that even a latex difficult to coagulate can be recovered as powder, and moreover, the equipment is simplified because spraying and drying can be carried out in one step. Further, waste water does not generate, so that a device for waste water treatment is not needed, and thus there is an advantage such that the cost of equipment is low.

On the other hand, an anion emulsifier such as sodium alkylbenzene sulfonate as an emulsifier and a sulfonic acid or sulfuric acid as an acid catalyst are generally used in the production of the latex of the silicone polymer.

Therefore, in the powder which is recovered by use of the spray drying method from the latex of the vinyl polymer containing the silicone polymer obtained by polymerization of a vinyl monomer in the presence of the latex of the silicone polymer, a large amount of sulfates derived from the emulsifier and the acid catalyst is remaining.

In a shaped article obtained by blending of such powder of the vinyl polymer containing the silicone polymer with a polycarbonate resin (hereinafter, referred to as "PC resin"), hydrolysis of PC resin is accelerated by the sulfates remaining in the powder and thus the physical properties of the shaped article are considerably deteriorated.

To solve this problem, for example, a method of blending powder of a vinyl polymer obtained by spray drying of a latex of a vinyl polymer containing a silicone polymer having a specified composition with a thermoplastic resin such as PC resin to prevent lowering of breaking strength of the shaped article after wet heat treatment and to prevent lowering of hydrolysis resistance of PC resin is shown (Patent Document 1).

However, the condition of the wet heat treatment shown in Patent Document 1 is mild and thus it is not sufficient for the evaluation of hydrolysis resistance. The powder of a vinyl polymer shown in Patent Document 1 contains a large amount of sulfates and does not have enough effect for prevention of lowering of hydrolysis resistance of PC resin.

In addition, a method of blending powder of a vinyl polymer obtained by spray drying of a latex obtained by emulsion polymerization of a mixture of a silicone macromonomer and a vinyl monomer with a thermoplastic resin such as PC resin is shown in Patent Document 2.

Although a remaining amount of sulfates in the powder of a vinyl polymer shown in Patent Document 2 is small, it is presumed that the powder does not have sufficient improvement effect on impact resistance of the shaped article to be obtained and rather lowers the impact resistance because the molecular weight of the silicone macromonomer is low.

PRIOR ART REFERENCES

Patent Documents

Patent Document 1: Japanese Patent Application Laid-Open No. 2002-308,997
Patent Document 2: Japanese Patent Application Laid-Open No. Hei 10-182,987

SUMMARY OF THE INVENTION

Problem to be Solved by the Invention

Objects of the present invention are to provide powder of a vinyl polymer containing a silicone polymer which enables to improve impact resistance and to prevent lowering of hydrolysis resistance when blended with a resin such as PC resin, and to provide a method for producing the powder, a resin composition containing the aforementioned powder, and a shaped article obtained by shaping of the aforementioned resin composition.

To solve these problems, for example, a method of reducing the amounts of the anion emulsifier and the acid to be used in the step of preparing the latex of the silicone polymer in order to reduce the amount of sulfates remaining in the powder is recited. However, it is necessary to use at least a certain amount of the acid catalyst in order to obtain the silicone polymer, and there is a problem such that the polymerization time becomes extremely long and thus productivity is lowered when the amount of the catalyst is small.

Means for Solving the Problem

The present inventors have diligently researched to solve the above-mentioned problems and found a method for producing powder of a vinyl polymer containing a silicone polymer which enables to improve impact resistance and to prevent lowering of hydrolysis resistance when blended with a resin such as PC resin by optimizing the kinds and the amounts of the anion emulsifier and the acid to be used in the step of preparing the latex of the silicone polymer.

More specifically, the gist of the first present invention is a method for producing powder of a vinyl polymer containing a silicone polymer (hereinafter, referred to as "the present powder"), which comprises the step of spray-drying a latex of the vinyl polymer containing a silicone polymer obtained by polymerization of a vinyl monomer in the presence of a latex of the silicone polymer, 3.0 mmol or less of a sulfate being contained in 100 g of the powder of the vinyl polymer containing the silicone polymer.

The silicone polymer in the present invention is preferably a polyorganosiloxane having a toluene insoluble content of 20% by mass or more, a polyorganosiloxane having a mass average molecular weight of 15,000 or more, or a composite rubber containing a polyorganosiloxane and a polyalkyl (meth)acrylate.

The latex of the vinyl polymer containing a silicone polymer of present invention is preferably obtained by polymerization of a vinyl monomer in the presence of a latex of the silicone polymer by use of at least one polymerization initiator selected from a peroxide, an organic peroxide, and an azo initiator.

In addition, the gist of the second present invention is a resin composition containing the present powder and a resin.

In addition, the gist of the third present invention is a shaped article obtained by shaping of the aforementioned resin composition Effect of the Invention According to the method of the present invention, the present powder capable of providing a shaped article excellent in impact resistance and hydrolysis resistance when blended with a resin such as PC resin can be obtained.

The present powder enables to give a shaped article excellent in impact resistance and hydrolysis resistance when blended with a resin such as PC resin.

The resin composition of the present invention enables to give a shaped article excellent in impact resistance and hydrolysis resistance.

The shaped article of the present invention can be used in a wide range of uses such as the uses in which recycled materials from OA appliances and the like are used.

BEST MODE FOR CARRYING OUT THE INVENTION

The vinyl polymer containing a silicone polymer of the present invention (hereinafter, referred to as "the present polymer") can be obtained by polymerization of a vinyl monomer in the presence of a latex of the silicone polymer.

The silicone polymer in the present invention is preferably a polyorganosiloxane having a toluene insoluble content of 20% by mass or more, a polyorganosiloxane having a mass average molecular weight of 15,000 or more, or a composite rubber containing a polyorganosiloxane and a polyalkyl (meth)acrylate.

Note that, in the present invention, "(meth)acrylate" means "acrylate" or "methacrylate", and "(meth)acryloyl" means "acryloyl" or "methacryloyl".

The silicone polymer in the present invention preferably has a polymerizable vinyl functional group. It is possible to introduce a chemical bond between the silicone polymer and an alkyl(meth)acrylate component for a composite rubber that is described later or a monomer component for grafting when the silicone polymer has the polymerizable vinyl functional group.

The silicone polymer having the polymerizable vinyl functional group can be obtained by polymerization of dimethylsiloxane, a siloxane having a polymerizable vinyl functional group, and if necessary, at least one of a siloxane crosslinking agent and a siloxane having end-capping group.

As the dimethylsiloxane, for example, a cyclic dimethylsiloxane having a 3-membered ring or larger can be recited, and cyclic dimethylsiloxane having 3- to 7-membered ring are preferable. Specifically, hexamethylcyclotrisiloxane, octamethylcyclotetrasiloxane, decamethylcyclopentasiloxane, and dodecamethylcyclohexasiloxane can be recited. These compounds can be used alone or in a combination of two or more kinds thereof.

The siloxane having a polymerizable vinyl functional group is a siloxane compound having a polymerizable vinyl functional group and capable of combining with dimethylsiloxane through a siloxane bond. Various alkoxysilanes having a polymerizable vinyl functional group are preferable from the viewpoint of reactivity with dimethylsiloxane.

The siloxane having a polymerizable vinyl functional group is a component for introducing a polymerizable vinyl functional group at a side chain or an end of the silicone polymer.

Examples of the siloxane having a polymerizable vinyl functional group include (meth)acryloyloxysilanes such as β-(meth)acryloyloxyethyldimethoxymethylsilane, γ-(meth)acryloyloxypropyldimethoxymethylsilane, γ-(meth)acryloyloxypropylmethoxydimethylsilane, γ-(meth)acryloyloxypropyltrimethoxysilane, γ-(meth)acryloyloxypropylethoxydiethylsilane, γ-(meth)acryloyloxypropyldiethoxymethylsilane, and δ-(meth)acryloyloxybutyldiethoxymethylsilane; vinylsiloxanes such as tetramethyltetravinylcyclotetrasiloxane and methoxydimethylvinylsilane; vinylphenylsilanes such as p-vinylphenyldimethoxymethylsilane; mercaptosiloxanes such as γ-mercaptopropyldimethoxymethylsilane and γ-mercaptopropyltrimethoxysilane; and disiloxanes such as 1,3-bis(3-methacryloyloxypropyl)tetramethyldisiloxane and 1,3-bis(3-mercaptopropyl)tetramethyldisiloxane.

These compounds can be used alone or in a combination of two or more kinds thereof.

The siloxane crosslinking agent is a component for introducing a crosslinking structure into the silicone polymer to transform the silicone polymer to rubber. Examples thereof include a 3-functional or a 4-functional silane crosslinking agent.

Examples of the siloxane crosslinking agent include trimethoxymethylsilane, triethoxyphenylsilane, tetramethoxysilane, tetraethoxysilane, and tetrabutoxysilane. These compounds can be used alone or in a combination of two or more kinds thereof.

The siloxane having end-capping group is a siloxane compound which enables to end-cap the silicone polymer with an alkyl group and the like to terminate polymerization of the silicone polymer.

Examples of the siloxane having end-capping group include hexamethyldisiloxane, 1,3-bis(3-glycidoxypropyl) tetramethyldisiloxane, 1,3-bis(3-aminopropyl)tetramethyldisiloxane, and methoxytrimethylsilane.

In addition, 1,3-bis(3-methacryloyloxypropyl)tetramethyldisiloxane shown as an example of the siloxane having a polymerizable vinyl functional group can also be used as the siloxane having end-capping group.

In the present invention, as the method for producing the silicone polymer, for example, the following method can be recited.

At first, an emulsifier, an acid catalyst, and water are added to a siloxane mixture containing dimethylsiloxane, a siloxane having a polymerizable vinyl functional group, a siloxane crosslinking agent, if necessary, and a siloxane having end-capping group, if necessary, and the resulting mixture is emulsified and a siloxane latex is obtained. Subsequently, the siloxane latex is transformed into fine particles by use of a homomixer which can transform the siloxane latex into fine particles by shearing force generated by high speed rotation or a homogenizer which can transform the siloxane latex into fine particles by spurting power of a high pressure generator.

Subsequently, the siloxane latex thus transformed into fine particles is subjected to polymerization at a high temperature, for example, at 80° C. After the polymerization, the system is neutralized by an alkaline material and a latex of a silicone polymer is obtained.

As a method for obtaining the siloxane latex transformed into fine particles, a method using a homogenizer is preferable because it is possible to make the particle size distribution of the silicone polymer small.

Although the emulsifier to be used in the production of the latex of the silicone polymer is not particularly limited, an anion emulsifier and a nonion emulsifier are preferable.

Examples of the anion emulsifier include sodium alkylbenzene sulfonate, sodium diphenyl ether disulfonate, sodium alkylsulfate, sodium polyoxyethylene alkylsulfate, and sodium polyoxyethylene nonylphenyl ether sulfate.

Examples of the nonion emulsifier include polyoxyethylene alkyl ether, polyoxyethylene alkylenealkyl ether, polyoxyethylene distyrenated phenyl ether, polyoxyethylene tribenzylphenyl ether, and polyoxyethylene polyoxypropylene glycol.

Among these emulsifiers, the nonion emulsifiers are preferable because the amount of sulfates in the present powder can be reduced. Among the nonion emulsifiers, in particular, polyoxyethylene alkyl ether and polyoxyethylene distyrenated phenyl ether are preferable.

These emulsifiers can be used alone or in a combination of two or more kinds thereof.

The amount of emulsifier to be used is preferably 0.05 to 30 parts by mass relative to 100 parts of the siloxane mixture.

When the amount of emulsifier to be used is 0.05 part by mass or more relative to 100 parts of the siloxane mixture, the emulsion state of the siloxane mixture is stable, and when the amount of emulsifier to be used is 30 parts by mass or less, it is possible to suppress hydrolysis or coloring of the resin composition to be obtained.

Examples of the acid catalyst to be used for polymerization of the siloxane mixture include sulfonic acids such as aliphatic sulfonic acid, aliphatic substituted benzene sulfonic acid, and aliphatic substituted naphthalene sulfonic acid; and mineral acids such as sulfuric acid, hydrochloric acid, and nitric acid. These acids can be used alone or in a combination of two or more kinds thereof.

Among these acid catalysts, an aliphatic substituted benzene sulfonic acid is preferable from the viewpoint of good polymerizability.

The amount of acid catalyst to be used is preferably 0.05 to 10 parts by mass relative to 100 parts of the siloxane mixture and more preferably 0.2 to 5 parts by mass.

When the amount of acid catalyst to be used is 0.05 parts by mass or more relative to 100 parts of the siloxane mixture, the rate of polymerization of the siloxane mixture becomes proper and the productivity of the silicone polymer becomes good, and when the amount of acid catalyst to be used is 10 parts by mass or less, it is possible to suppress lowering of hydrolysis resistance of the resin composition to be obtained.

As a method for adding the acid catalyst at the time of producing the silicone polymer, a method of adding the catalyst in a lump to the latex of the siloxane mixture or a method of dropping the catalyst into the latex of the siloxane mixture at a constant rate can be recited.

Termination of the polymerization of the siloxane mixture can be carried out, for example, in such a way that the reaction liquid is cooled and an alkaline material such as sodium hydroxide, potassium hydroxide, sodium carbonate, or ammonia is added to the latex for neutralization.

The silicone polymer in the present invention is preferably a polyorganosiloxane having a toluene insoluble content of 20% by mass or more, a polyorganosiloxane having a mass average molecular weight of 15,000 or more, or a composite rubber containing a polyorganosiloxane and a polyalkyl (meth)acrylate.

The polyorganosiloxane having a toluene insoluble content of 20% by mass or more is a polyorganosiloxane which has a toluene insoluble content of 20% by mass or more as measured by the method described in Examples in the present specification.

The toluene insoluble content of the polyorganosiloxane is preferably 50% by mass or more and 90% by mass or less.

When the toluene insoluble content of the polyorganosiloxane is 20% by mass or more, impact resistance of the shaped article to be obtained becomes good.

To allow the polyorganosiloxane to have a toluene insoluble content of 20% by mass or more, it is possible to adjust the blending amount of the siloxane crosslinking agent or the siloxane having end-capping group.

The polyorganosiloxane having a mass average molecular weight of 15,000 or more is a polyorganosiloxane which has a mass average molecular weight of 15,000 or more as measured by the method described in Examples in the present specification.

The mass average molecular weight of the polyorganosiloxane is preferably 50,000 or more and 500,000 or less.

When the mass average molecular weight of the polyorganosiloxane is 15,000 or more, impact resistance of the shaped article to be obtained becomes good.

To allow the polyorganosiloxane to have a mass average molecular weight of 15,000 or more, it is possible to adjust the blending amount of the siloxane crosslinking agent or the siloxane having end-capping group.

The composite rubber containing a polyorganosiloxane and a polyalkyl (meth)acrylate (hereinafter, referred to as "the present composite rubber") is a rubber in which the polyorganosiloxane and the polyalkyl(meth)acrylate are made into a composite state.

The present composite rubber may contain a butadiene rubber or a polymer having a glass transition temperature of 0° C. or higher, if necessary, besides the polyorganosiloxane and the polyalkyl(meth)acrylate.

The polyalkyl(meth)acrylate to be used in the present composite rubber preferably has a crosslinking structure and a glass transition temperature of 0° C. or lower.

The polyalkyl(meth)acrylate is obtained by polymerization of an alkyl(meth)acrylate component. The alkyl(meth)acrylate component contains an alkyl(meth)acrylate and, if necessary, an acrylic cross liking agent.

Examples of the alkyl(meth)acrylate include an alkyl acrylate such as methyl acrylate, ethyl acrylate, n-propyl acrylate, n-butyl acrylate, and 2-ethylhexyl acrylate; and an alkyl methacrylate having an alkyl group with at least 6 carbon atoms such as hexyl methacrylate, 2-ethylhexyl methacrylate, and n-dodecyl methacrylate. Among these alkyl(meth) acrylates, n-butyl acrylate is preferable because impact resistance and gloss of the shaped article to be obtained can be improved.

These alkyl(meth)acrylates can be used alone or in a combination of two or more kinds thereof.

The acrylic cross liking agent is a component for introducing a crosslinking structure into the polyalkyl(meth)acrylate and also functions as a starting point of graft polymerization when a vinyl monomer that is described later is grafted.

Examples of the acrylic cross liking agent include allyl methacrylate, ethylene glycol di(meth)acrylate, propylene glycol di(meth)acrylate, 1,3-butylene glycol di(meth)acrylate, 1,4-butylene glycol di(meth)acrylate, triallyl cyanurate, and triallyl isocyanurate. These compounds can be used alone or in a combination of two or more kinds thereof.

As a method for producing the present composite rubber, for example, a method is recited in which an alkyl(meth) acrylate component is added to a latex of polyorganosiloxane and polymerization thereof is carried out by use of a conventional radical polymerization initiator and a latex of a composite rubber is obtained.

As a method for adding the alkyl(meth)acrylate component to the latex of polyorganosiloxane, for example, a method of adding the alkyl(meth)acrylate component in a lump to the latex of polyorganosiloxane or a method of dropping the alkyl(meth)acrylate component into the latex of polyorganosiloxane at a constant rate can be recited.

Among the above-mentioned methods, the method of adding the alkyl(meth)acrylate component in a lump to the latex of polyorganosiloxane is preferable because impact resistance of the shaped article to be obtained can be improved.

It is possible to add an emulsifier when the latex of a composite rubber is produced in order to stabilize the latex and to control the average particle diameter of the composite rubber.

As the emulsifier to be used when the latex of the composite rubber is produced, the same emulsifier as that to be used when the aforementioned latex of polyorganosiloxane is produced can be recited, and an anion emulsifier or a nonion emulsifier is preferable. The nonion emulsifier is more preferable from the viewpoint of reduction of the amount of sulfates in the powder.

As the polymerization initiator to be used in the polymerization of the alkyl (meth)acrylate component, at least one polymerization initiator selected from peroxides, organic peroxides, and azo initiators can be recited.

As for the peroxide, there is a case when the peroxide is used alone or jointly used with a reducing agent in the form of a redox initiator. As for the organic peroxides, there is also a case when the organic peroxide is used alone or jointly used with a reducing agent in the form of a redox initiator.

As for the azo initiators, there are oil soluble azo initiators and water soluble azo initiators.

Examples of the peroxide include hydrogen peroxide, potassium persulfate, and ammonium persulfate. These compounds can be used alone or in a combination of two or more kinds thereof.

Examples of the organic peroxide include diisopropylbenzenehydroperoxide, p-menthanehydroperoxide, cumenehydroperoxide, t-butylhydroperoxide, succinic acid peroxide, t-butylperoxyneodecanoate, t-butylperoxyneoheptanoate, t-butylperoxypivalate, 1, 1,3,3-tetramethylbutylperoxy-2-ethylhexanoate, and t-butylperoxy-2-ethylhexanoate. These compounds can suppress hydrolysis of the resin composition to be obtained.

These organic peroxides can be used alone or in a combination of two or more kinds thereof.

When the peroxide or the organic peroxide is used in combination with a reducing agent in the form of a redox initiator, it is preferable to jointly use the aforementioned peroxide or organic peroxide, a reducing agent such as sodium formaldehyde sulfoxylate, L-ascorbic acid, fructose, dextrose, sorbose, or inositol, and ferrous sulfate.disodium ethylenediamine tetraacetate.

These reducing agents can be used alone or in a combination of two or more kinds thereof. Note that, when sodium formaldehyde sulfoxylate is used as the reducing agent, the amount of use thereof is preferable controlled in a low level as much as possible from the viewpoint of reduction of the amount of sulfates in the powder.

Examples of the oil soluble azo initiator include 2,2'-azobisisobutyronitrile and dimethyl 2,2'-azobis(2-methylpropionate). These compounds can be used alone or in a combination of two or more kinds thereof.

Examples of the water soluble azo initiator include 4,4'-azobis(4-cyanovaleric acid), 2,2'-azobis[N-(2-carboxymethyl)-2-methylpropionamidine]hydrate, 2,2'-azobis-(N, N'-dimethyleneisobutylamidine) dihydrochloride, and 2,2'-azobis[2-(2-imidazoline-2-yl)propane]dihydrochloride.
These compounds can be used alone or in a combination of two or more kinds thereof.

Among the above-mentioned polymerization initiators, the organic peroxide, the redox initiator, or the azo initiator is preferable because the amount of sulfates in the present powder can be reduced.

Among the redox initiators, it is preferable to use L-ascorbic acid, fructose, dextrose, sorbose, or inositol.

It is preferable that the content of the polyorganosiloxane in the present composite rubber (100% by mass) be 1 to 99% by mass and the content of the polyalkyl (meth)acrylate in the present composite rubber be 1 to 99% by mass, respectively.

When the content of the polyorganosiloxane in the present composite rubber is 1% by mass or more, impact resistance of the shaped article to be obtained becomes good, and when the content is 99% by mass or less, coloring power of pigments in the shaped article to be obtained is not lowered.

When the content of the polyalkyl(meth)acrylate in the present composite rubber is 1% by mass or more, tinting power of pigments in the shaped article to be obtained is not lowered, and when the content is 99% by mass or less, impact resistance of the shaped article to be obtained becomes good.

It is more preferable that the content of the polyorganosiloxane in the present composite rubber (100% by mass) be 6 to 90% by mass and the content of the polyalkyl (meth) acrylate be 10 to 94% by mass.

The contents of the polyorganosiloxane and the polyalkyl (meth)acrylate can be calculated from the mass ratio of the polyorganosiloxane component and the alkyl (meth)acrylate component to be used for the production of the present composite rubber.

The vinyl monomer to be polymerized in the presence of the silicone polymer is a monomer component for grafting and is at least one kind selected from a (meth)acrylate for grafting, an aromatic vinyl monomer, and a vinyl cyanide monomer.

In the present invention, it is preferable that at least a part of the monomer component for grafting be grafted to the silicone polymer in the form of a graft copolymer.

Examples of the (meth)acrylate for grafting include methyl (meth)acrylate, ethyl(meth)acrylate, n-propyl(meth)acrylate, i-propyl(meth)acrylate, n-butyl(meth)acrylate, i-butyl(meth)acrylate, t-butyl(meth)acrylate, and 2-ethylhexyl(meth)acrylate. These compounds can be used alone or in a combination of two or more kinds thereof.

Examples of the aromatic vinyl monomer include styrene, α-methylstyrene, vinyl toluene, and chlorostyrene. These compounds can be used alone or in a combination of two or more kinds thereof.

Examples of the vinyl cyanide monomer include acrylonitrile and methacrylonitrile. These compounds can be used alone or in a combination of two or more kinds thereof.

As a method for polymerizing the monomer component for grafting, a method of adding the monomer component for grafting to a latex of the silicone polymer followed by one step or a multi-step polymerization.

In the case of the multi-step polymerization, it is preferable to carry out polymerization by split or continuous addition of the monomer component for grafting in the presence of the latex of the silicone polymer. In this way, a stable polymerization can be carried out and a latex having a desired particle diameter and a particle size distribution can be stably obtained.

As the polymerization initiator to be used in the polymerization of the monomer component for grafting, the same polymerization initiators as those to be used when the polymerization of the aforementioned alkyl(meth)acrylate component is carried out can be recited.

Among these initiators, the organic peroxide, the redox initiator, or the azo initiator is preferable because the amount of sulfates in the present powder can be reduced. Among the redox initiators, it is preferable to use L-ascorbic acid, fructose, dextrose, sorbose, or inositol as a reducing agent.

When the monomer component for grafting is polymerized, an emulsifier can be added in order to stabilize the latex and to control the average particle diameter of the present polymer.

As the emulsifier to be used when the monomer component for grafting is polymerized, the same emulsifier as that to be used when the aforementioned latex of polyorganosiloxane is produced can be recited, and an anion emulsifier or a nonion emulsifier is preferable. The nonion emulsifier is more preferable from the viewpoint of reduction of the amount of sulfates in the powder.

The present polymer is produced by emulsion polymerization and obtained in the form of latex.

The mass average particle diameter of the present polymer is preferably 50 to 2,000 nm because impact resistance and surface appearance of the shaped article to be obtained become good.

When the mass average particle diameter of the present polymer is 50 nm or more, impact resistance of the shaped article to be obtained becomes good and when the mass average particle diameter of the present polymer is 2,000 nm or less, impact resistance and surface appearance of the shaped article to be obtained become good.

The present powder can be obtained by spray drying of the latex of the present polymer.

The amount of sulfates contained in the present powder is 3.0 mmol or less in 100 g of the present powder, and is preferably 0.02 to 3.0 mmol, more preferably 0.1 to 2.8 mmol, and furthermore preferably 0.1 to 2.5 mmol.

When the amount of sulfates contained in 100 g of the present powder exceeds 3.0 mmol, hydrolysis resistance of the shaped article to be obtained is lowered and thus physical properties of the shaped article to be obtained are considerably lowered, and hence it is not preferable. In addition, when the amount of sulfates contained in 100 g of the present powder is less than 0.02 mmol, the amount of the catalyst at the time of producing the silicone polymer is too small and thus the polymerization time becomes extremely long and productivity is lowered, and hence it is not preferable.

Note that, the amount of sulfates contained in the present powder is quantitatively determined by the method described in Examples in the present specification. Specifically, the amount of sulfates can be measured by use of a sample obtained in such a way that the present powder is subjected to perfect combustion and the generated gas is absorbed in an aqueous hydrogen peroxide solution. In this case, sulfonates, sulfinates, and the like contained in the present powder are also quantified besides the sulfates.

The amount of sulfates contained in the present powder can be adjusted by control of the amounts of, for example, an emulsifier such as sodium dodecylbenzenesulfonate and an acid catalyst such as dodecylbenzenesulfonate to be used in the production of polyorganosiloxane; an emulsifier and a reducing agent such as sodium formaldehyde sulfoxylate to be used in the production of the composite rubber; and an emulsifier and a reducing agent such as sodium formaldehyde sulfoxylate to be used in the production of the monomer component for grafting.

The present powder is recovered by spray drying of the latex of the present polymer. Therefore, the sulfate compounds used in the step of polymerization of the present polymer remain as they are in the present powder.

Consequently, in order to allow the amount of sulfates contained in 100 g of the present powder to become 3.0 mmol or less, the amount of sulfate compounds to be used in the production of 100 g of the present powder may be adjusted to less than 3.0 mmol or less.

When the latex of the present polymer is subjected to spray drying, an additive such as antioxidant can be added to the latex of the present polymer, if necessary.

Spray drying is carried out in such a way that the latex of the present polymer is sprayed in a spray dryer in the form of fine liquid droplets and then dried by hot air.

Examples of the method of spraying the latex of the present polymer in a spray dryer in the form of fine liquid droplets include a rotary disc method, pressure nozzle method, two fluid nozzle method, and pressure two fluid nozzle method.

The volume of the spray dryer may vary from a small scale volume in a spray dryer for a laboratory use to a large scale one in a spray dryer for a industrial use.

The structure of a supply part of heated gas for drying and the structure of a discharge part of the heated gas for drying and dried powder in the spray dryer can be properly selected in accordance with the purpose.

The temperature of the heated gas for drying is preferably 200° C. or lower and more preferably 120 to 180° C.

In the present invention, the latex of the present polymer to be used in preparation of the present powder can be used alone or in a combination of two or more kinds thereof.

In the present invention, it is possible to carry out spray drying of the latex of the present polymer after adding inorganic fine particles such as silica thereto in order to improve powder characteristics of the present powder at the time of spray drying such as blocking and bulk density.

The resin composition of the present invention contains the present powder and a resin.

The resin to be used in the present invention is at least one kind selected from a curable resin, thermoplastic resin, and thermoplastic elastomer.

Examples of the curable resin include an epoxy resin, phenol resin, unsaturated polyester resin, melamine resin, and urea resin. Among them, the epoxy resin is preferable because it is excellent in electric characteristics and suitable for semiconductor encapsulation. These resins can be used alone or in a combination of two or more kinds thereof.

The curable resin can be classified into a thermo-curable resin and a photo-curable resin and either one may be used.

Examples of the epoxy resin include a dicyclopentadiene type epoxy resin, cresol novolac type epoxy resin, phenol novolac type epoxy resin, bisphenol type epoxy resin, and biphenyl type epoxy resin. These epoxy resins can be used alone or in a combination of two or more kinds thereof.

As the epoxy resin, a solid epoxy resin is preferable because the dispersibility of the present powder becomes good.

Examples of the curing agent for the epoxy resin include a phenol curing agent such as phenol novolac resin and cresol novolac resin; an amine curing agent; and an acid anhydride curing agent. These curing agents can be used alone or in a combination of two or more kinds thereof. The amount of the curing agent to be used is preferably a stoichiometric amount with respect to the amount of the epoxy group.

Examples of the phenol resin include a resol type phenol resin and a novolac type phenol resin. The phenol resin may be the one modified with a drying oil, a xylene resin or a melamine resin.

As the phenol resin, a solid phenol resin is preferable because the dispersibility of the present powder becomes good.

When the phenol resin is a novolac type phenol resin, a polyamine such as hexamine, epoxy resin, isocyanate compound, polyformaldehyde compound, or resol type phenol resin can be jointly used as a curing agent.

As an example of the unsaturated polyester resin, a compound obtained by a reaction of a saturated dibasic acid such as isophthalic acid, orthophthalic acid, phthalic anhydride, succinic acid, adipic acid, or sebacic acid, a polyhydric alcohol such as ethylene glycol, dipropylene glycol, 1,3-butanediol, 1,6-hexanediol, neopentyl glycol, or hydrogenated bisphenol A, and an unsaturated dibasic acid such as maleic acid, maleic anhydride, fumaric acid, itaconic acid, or endo methylenetetrahydrophthalic anhydride at 180 to 250° C. can be recited.

The unsaturated polyester resin may be obtained by copolymerization of the above-mentioned unsaturated dibasic acid and a monomer copolymerizable with the above-mentioned unsaturated dibasic acid. Examples of the monomer copolymerizable with the above-mentioned unsaturated dibasic acid include styrene, t-butylstyrene, divinylbenzene, diallylphthalate, vinyl toluene, and (meth)acrylate.

The content of the present powder in the curable resin composition (100% by mass) is preferably 0.5 to 45% by mass and more preferably 0.5 to 35% by mass.

When the content of the present powder in the curable resin composition (100% by mass) is 0.5% by mass or more, impact resistance of the shaped article to be obtained become good, and when the content of the present powder in the curable resin composition is 45% by mass or less, impact resistance and surface appearance of the shaped article to be obtained, which are the inherent characteristics of the curable resin, are not deteriorated.

The resin composition in the case when the matrix component is a curable resin (hereinafter, referred to as "curable resin composition") can contain various additives as long as they do not sacrifice the purpose of the present invention.

Examples of the additives include various curing accelerators; release agents such as silicone oils, natural waxes, and synthesized waxes; fillers such as crystallized silica, fused silica, calcium silicate, and alumina; fibers such as glass fiber and carbon fiber; flame retardants such as antimony; halogen trapping agents such as rare earth oxides; coloring agents such as carbon black and red iron oxide; and silane coupling agents.

As the method for preparing the curable resin composition, for example, a method of mixing each component in a solution state and a method of melt-mixing each component with a mixing roll or a kneader followed by crashing or tableting after cooling can be recited.

As the method for shaping the curable resin composition, for example, a transfer molding, a sheet compound molding, and a bulk molding can be recited.

In addition, when the curable resin composition is in a solution state, it can be coated as an adhesive.

Examples of the thermoplastic resin include an olefin resin such as polypropylene (PP) and polyethylene (PE); a styrene (St) resin such as polystyrene (PS), high impact polystyrene (HIPS), (meth)acrylate-styrene copolymer (MS), styrene-acrylonitrile copolymer (SAN), styrene-maleic anhydride copolymer (SMA), acrylonitrile-butadien-styrene copolymer (ABS), acrylate-styrene-acrylonitrile copolymer (ASA), and acrylonitrile-ethylene-propylene rubber-styrene copolymer (AES); an acrylic (Ac) resin such as polymethyl methacrylate (PMMA); PC resin; a polyamide resin (PA); a PEs resin such as polyethylene terephthalate (PET) and polybutylene terephthalate (PBT); an engineering plastic such as (modified) polyphenylene ether ((m-)PPE) resin, polyoxymethylene (POM) resin, polysulfone (PSO) resin, polyarylate (PAr) resin, and polyphenylene (PPS) resin; a thermoplastic urethane (PU) resin; a polymer alloy such as an alloy of PC resin and St resin like PC/ABS, an alloy of PVC resin and St resin like PVC/ABS, an alloy of PA resin and St resin like PA/ABS, an alloy of PA resin and TPE, an alloy of PA resin and a polyolefin resin like PA/PP, an alloy of PC resin and PEs resin like PC/PBT, an alloy between olefin resins like a polyolefin resin/TPE or PP/PE, an alloy between PPE resins like PPE/HIPS, PPE/PBT, or PPE/PA, and an alloy of PVC resin and Ac resin like PVC/PMMA; and PVC resin such as unplasticized vinyl chloride resin, semi unplasticized vinyl chloride resin, or plasticized vinyl chloride resin.

Among these thermoplastic resins, PC resin, PA resin, PET resin, PBT resin, (m-)PPE resin, POM resin, PU resin, an alloy of PC resin and St resin like PC/ABS, an alloy of PA resin and St resin like PA/ABS, an alloy of PA resin and TPE, an alloy of PA resin and a polyolefin resin like PA/PP, an alloy of PC resin and PEs resin like PC/PBT, and an alloy between PPE resins like PPE/PBT or PPE/PA are preferable. Further, PC resin is more preferable.

Examples of the thermoplastic elastomer include styrene elastomer, olefin elastomer, vinyl chloride elastomer, urethane elastomer, polyester elastomer, polyamide elastomer, fluorine elastomer, 1,2-polybutadien, and trans 1,4-polyisoprene.

Among these thermoplastic elastomers, urethane elastomer, polyester elastomer, and polyamide elastomer are preferable.

The content of the present powder in the thermoplastic resin composition or in the thermoplastic elastomer composition (100% by mass) is preferably 0.5 to 45% by mass and more preferably 0.5 to 35% by mass.

When the content of the present powder in the thermoplastic resin composition or in the thermoplastic elastomer composition (100% by mass) is 0.5% by mass or more, impact resistance of the shaped article to be obtained become good, and when the content of the present powder in the thermoplastic resin composition or in the thermoplastic elastomer composition is 45% by mass or less, impact resistance and surface appearance of the shaped article to be obtained, which are the inherent characteristics of the thermoplastic resin composition or the thermoplastic elastomer composition, are not deteriorated.

As the method for preparing the resin composition in the case when the matrix component is the thermoplastic resin or the thermoplastic elastomer (hereinafter, referred to as "thermoplastic resin composition"), for example, a method of mixing the present powder with the powder of the thermoplastic resin or the thermoplastic elastomer with Henschel Mixer, a tumbler, or the like followed by melt mixing the resulting mixture with an extruder, a kneader, a mixer, or the like and a method of previously melting the thermoplastic resin or the thermoplastic elastomer followed by adding the remaining materials to the molten mixture can be recited.

The thermoplastic resin composition can contain various additives as long as they do not sacrifice the purpose of the present invention.

Examples of the additives include stabilizers such as a phenol stabilizer, phosphorus stabilizer, ultraviolet ray absorber, and amine light stabilizer; flame retardants such as phosphorus, brome, silicone, and organometallic flame retardant; modifiers for giving various physical properties such as hydrolysis resistance; fillers such as titanium oxide and talc; dies and pigments; and plasticizers.

As the method for shaping the thermoplastic resin composition, for example, a method of subjecting the thermoplastic resin composition or a mixture of the present powder with the thermoplastic resin composition to injection molding can be recited.

The shaped article of the present invention is useful for housings of OA appliances such as personal computer, printer, and copying machine; housings of home electronics such as liquid crystal television and DVD player; automobile exterior materials such as mirror housing; and automobile interior materials such as instrument panel.

In addition, the shaped article of the present invention is particularly useful for the uses in which recycle materials are used such as OA appliances because it is excellent in impact resistance and hydrolysis resistance.

EXAMPLES

Hereinafter, the present invention will be explained in more detail. Note that, in the followings, "part" and "%" means "part by mass" and "% by mass", respectively.

Evaluations of various physical properties shown in Examples are carried out by the methods to be shown below.

(1) Solid Content

The latex of polyorganosiloxane was dried in a hot air oven at 180° C. for 30 minutes, and a solid content was calculated from the following equation.

Solid content [%]=(mass of the residue after the drying at 180° C. for 30 minutes)/(mass of the latex before the drying)×100

(2) Toluene Insoluble Content

Polyorganosiloxane is coagulated from the latex of polyorganosiloxane by use of isopropanol and dried with a vacuum dryer at 50° C. for a whole day and night.

In 80 ml of toluene, 0.5 g of the thus obtained polyorganosiloxane was dipped at room temperature for 24 hours and then centrifuged at 12,000 rpm for 60 minutes, and a toluene insoluble portion was separated. The toluene insoluble portion thus separated was dried with a vacuum dryer at 50° C. for a whole day and night, and the mass thereof was measured.

Toluene insoluble content was calculated from the following equation.

Toluene insoluble content [%]=(mass of the toluene insoluble portion after the separation and the drying)/(mass of polyorganosiloxane before the dipping in toluene)×100

(3) Mass Average Molecular Weight

Polyorganosiloxane is coagulated from the latex of polyorganosiloxane by use of isopropanol and dried with a vacuum dryer at 50° C. for a whole day and night. Measurement of the molecular weight of the thus obtained polyorganosiloxane was carried out with gel permeation chromatography (GPC).

The measurement condition of GPC is as follows, and mass average molecular weight was obtained by use of a calibration curve based on standard polystyrene.

Apparatus: HCL-8220 manufactured by Tosoh Corporation

Column: TSK-gel Super HZM-M manufactured by Tosoh Corporation (4 columns each having internal diameter of 4.6 mm and length of 15 cm, and exclusion limit of $4\times10^6$)

Eluant: THF

Flow rate of eluant: 0.35 ml/min

Temperature of measurement: 40° C.

Injection volume of a sample: 10 μl (concentration of a sample: 0.1%)

(4) Amount of Sulfates in Powder

A sample was prepared in such a way that 0.05 g of powder of a vinyl polymer containing a silicone polymer was subjected to perfect combustion with a combustion apparatus (trade name "QF-02" manufactured by Mitsubishi Chemical Corporation) and the emerged gas was absorbed in 20 ml of 0.3% aqueous hydrogen peroxide solution, and the amount of sulfate ion ($SO_4^{2-}$) was measured with an ion chromatograph (trade name "IC-20" manufactured by Nippon Dionex K.K., separation column: IonPac AS12A).

A calibration curve was prepared by use of a standard solution of sodium sulfate (sodium sulfate standard solution for ion chromatography manufactured by Kishida Chemical Co., Ltd., $SO_4^{2-}$: 1,000 mg/L) with respect to one point of the amount of $SO_4^{2-}$ at 20 ppm.

The amount of sulfate ion in 100 g of the powder of a vinyl polymer containing a silicone polymer was calculated from the concentration of sulfate ion quantified with ion chromatography by use of the following equation.

Amount of sulfate ion in the powder [ppm]={(concentration of $SO_4^{2-}$ in the sample solution [ppm]−concentration of $SO_4^{2-}$ in a blank solution [ppm])×the amount of aqueous hydrogen peroxide solution [ml]}/the amount of the powder sample [g]

Amount of sulfate ion in 100 g of the powder [mmol]= the amount of sulfate ion in the powder [ppm]/10/96

The number of mole of sulfate ion was assumed to be the same as the number of mole of sulfates, the amount of sulfates in 100 g of the powder [mmol] was obtained from the amount of sulfate ion in 100 g of the powder [mmol].

(5) Melt Flow Rate (MFR)

A pellet of a resin composition was dried at 80° C. for 12 hours and MFR thereof was measured with a melt indexer (trade name "L-243-1531" manufactured by Techno Seven Co., Ltd.) under the condition of a temperature of measurement of 300° C., previous heating at 300° C. for 5 minutes, and a load of 1.20 kgf, in accordance with JIS K 7210.

(6) Hydrolysis Resistance

A pellet of a resin composition was subjected to a heat-moisture treatment with a pressure cooker (trade name "PC304RIII" manufactured by Hirayama Manufacturing Corporation) under the condition of a temperature of 120° C. and 100% RH for 60 hours. Subsequently, the sample subjected to the heat-moisture treatment was dried at 80° C. for 12 hours and then MRF of the sample was measured in accordance with JIS K 7210.

ΔMFR was calculated by use of the following equation and hydrolysis resistance was evaluated. As the value of ΔMFR becomes smaller, it is shown that hydrolysis resistance becomes better.

$$\Delta MFR[\%] = \{(MFR \text{ after the heat-moisture treatment})/(MFR \text{ before the heat-moisture treatment}) \times 100\} - 100.$$

(7) Thermal Stability

A pellet of a resin composition was dried at 80° C. for 12 hours and MFR thereof was measured with a melt indexer (trade name "L-243-1531" manufactured by Techno Seven Co., Ltd.) under the condition of a temperature of measurement of 300° C., previous heating at 300° C. for 30 minutes, and a load of 1.20 kgf, in accordance with ES K 7210.

ΔMFR was calculated by use of the following equation and thermal stability was evaluated. As the value of ΔMFR becomes smaller, it is shown that thermal stability becomes better.

$$\Delta MFR[\%] = \{(MFR \text{ after kept at } 300° \text{ C. for 30 minutes})/(MFR \text{ after kept at } 300° \text{ C. for 5 minutes}) \times 100\} - 100.$$

Further, coloring of a strand of the resin composition was judged by visual inspection according to the following criteria.

○: There is no difference in coloring between a strand after kept at 300° C. for 5 minutes and a strand after kept at 300° C. for 30 minutes.

x: Coloring is observed for a strand after kept at 300° C. for 30 minutes relative to a strand after kept at 300° C. for 5 minutes.

(8) Charpy Impact Strength

By use of a test piece of the resin composition, Charpy impact strength thereof was measured at a temperature of measurement of −30° C. and 23° C. in accordance with JIS K 7111.

(9) Izod Impact Strength

A test piece was prepared by cutting of a sheet shaped article, and Izod impact strength thereof was measured at a temperature of measurement of 23° C. in accordance with ASTM D256 (thickness: ¼ inch; unit: J/m).

(10) Coefficient of Water Absorption

A sheet shaped article was cut into a test piece having a thickness of 3 mm, width of 50 mm, and length of 50 mm, and coefficient of water absorption thereof was measured in accordance with JIS K 6911.

(11) Electric Characteristics (Dielectric Constant and Dielectric Loss Tangent)

A sheet shaped article was cut into a test piece having a thickness of 3 mm, width of 30 mm, and length of 30 mm, and the test piece was placed under the environment of a temperature of 23° C. and a humidity of 60% for 90 hours and then dielectric constant and dielectric loss tangent were measured under the following condition.

Apparatus for measurement: RF impedance/material analyzer HP4291B (manufactured by Agilent Technologies, Inc.)

Frequency for measurement: 1 MHz and 1 GHz

Temperature of measurement: 23° C.

Humidity of measurement: 60%

(12) Flame Retardancy

A sheet shaped article was cut into 5 test pieces each having a thickness of 3 mm, width of 12.7 mm, and length of 127 mm, and these test pieces were placed under the environment of a temperature of 23° C. and a humidity of 50% for 48 hours, and then UL94 teat was carried out on these test pieces.

The number of the test pieces which generated flaming droplets that caused ignition of absorbent cotton out of the 5 test pieces was counted. Flame retardancy becomes better as the number becomes small.

Production Example 1

Production of a Latex of Polyorganosiloxane (S-1)

A hundred parts of a siloxane mixture was obtained by mixing of 97.5 parts of octamethylcyclotetrasiloxane (D4), 0.5 part of γ-methacryloyloxypropyldimethoxymethylsilane (DSMA), and 2.0 parts of tetraethoxysilane (TEOS). To the siloxane mixture, a solution obtained by dissolution of 0.67 part of sodium dodecylbenzenesulfonate (DBSNa) into 233 parts of deionized water was added and stirred with a homomixer at 10,000 rpm for 5 minutes. Subsequently, the resulting mixture was passed through a homogenizer for 2 times under a pressure of 20 Mpa, and a siloxane latex was obtained.

To a separable flask equipped with a cooling tube, a thermometer, and a stirrer, the above-mentioned siloxane latex was introduced and further 1.0 part of dodecylbenzene sulfonate (DBSH) was added as a catalyst, and a siloxane latex composition was obtained. Subsequently, the siloxane latex composition thus obtained was kept at 80° C. for 8 hours and polymerization of organosiloxane was carried out.

After the polymerization, the resulting polymer was cooled and neutralized to pH 7 by use of 5% aqueous sodium hydroxide solution, and a latex of polyorganosiloxane (S-1) was obtained.

The solid content of the latex of polyorganosiloxane (S-1) was 26.0% and the toluene insoluble content was 70.9%.

Production Examples 2 to 7

Production of Latexes of Polyorganosiloxane (S-2 to S-7)

The same procedure as in Production Example 1 was carried out except that the amounts of the monomer (siloxane), the emulsifier, and the acid catalyst to be added were adopted as shown in Table 1, and the latexes of polyorganosiloxane (S-2 to S-7) were obtained.

Solid contents and toluene insoluble contents of the latexes of polyorganosiloxane (S-2 to S-7) are shown in Table 1.

Mass average molecular weights of polyorganosiloxane (S-1 to S-5) were not measured because toluene insoluble contents thereof were 20% or more. Mass average molecular weights of polyorganosiloxane (S-6 and S-7) were measured.

Note that, "4085" shown in Table 1 represents polyoxyethylene (85) monotetradecyl ether (trade name "Emulgen 4085" manufactured by Kao Corporation).

TABLE 1

| Polyorganosiloxane (latex) | | Prod. Ex. 1 S-1 | Prod. Ex. 2 S-2 | Prod. Ex. 3 S-3 | Prod. Ex. 4 S-4 | Prod. Ex. 5 S-5 | Prod. Ex. 6 S-6 | Prod. Ex. 7 S-7 |
|---|---|---|---|---|---|---|---|---|
| Monomer (siloxane) [part] | D4 | 97.5 | 97.5 | 97.5 | 97.5 | 97.5 | 99.5 | 99.5 |
| | DSMA | 0.5 | 0.5 | 0.5 | 0.5 | 0.5 | 0.5 | 0.5 |
| | TEOS | 2.0 | 2.0 | 2.0 | 2.0 | 2.0 | 0.0 | 0.0 |
| Emulsifier [part] | DBSNa | 0.67 | 0.67 | 0.67 | 0.67 | 0.67 | 0.67 | — |
| | 4085 | — | — | — | — | — | — | 1.0 |
| Acid catalyst [part] | DBSH | 1.0 | 0.5 | 0.2 | 5.0 | 0.67 | 0.5 | 0.2 |
| Solid content [%] | | 26.0 | 26.8 | 26.5 | 26.5 | 26.4 | 26.8 | 26.7 |
| Toluene insoluble content [%] | | 70.9 | 75.0 | 75.4 | 70.0 | 71.0 | 14.0 | 13.0 |
| Mass average molecular weight | | — | — | — | — | — | 230,000 | 200,000 |

Abbreviation: Prod. Ex. = Production Example

Example 1

Production of Powder of a Vinyl Polymer Containing Silicone Polymer (G-1)

To a separable flask equipped with a cooling tube, a thermometer, a nitrogen introduction tube, and a stirrer, 115.4 parts of the latex of polyorganosiloxane (S-1) obtained in Production Example 1 (30.0 parts as polyorganosiloxane (S-1)) were introduced. Further, 57.5 parts of deionized water, 39.01 parts of n-butyl acrylate (BA), 0.99 part of allyl methacrylate (AMA), and 0.08 part of cumenehydroperoxide (CHP) were added thereto and mixed.

The inside environment of the separable flask was replaced with nitrogen by introduction of nitrogen and heated to 60° C. When the temperature of the liquid reached 60° C., a mixed liquid of 0.0005 part of ferrous sulfate (Fe), 0.0015 part of sodium ethylenediamine tetraacetate (EDTA), 0.3 part of L-ascorbic acid (AH), and 5.0 parts of deionized water was added to the liquid and polymerization was started. Subsequently, the liquid temperature was kept at 60° C. for 1 hour and polymerization was completed, and a latex of a composite rubber was obtained.

To the latex of a composite rubber thus obtained, 0.25 part of DBSNa and 5.0 parts of deionized water were added. Subsequently, a mixed liquid (monomer components for grafting and an organic peroxide) of 9.0 parts of acrylonitrile (AN), 21.0 parts of styrene (St), and 0.06 part of CHP was dropped therein at 70° C. over the period of 2 hours. Subsequently, the resulting mixed liquid was kept at 70° C. for 1 hour and polymerization was completed, and a latex of a vinyl polymer containing silicone polymer (G-1) was obtained.

The latex of a vinyl polymer containing silicone polymer (G-1) thus obtained was subjected to spray drying by use of an atomized type spray dryer (trade name "L-8 spray dryer" manufactured by Ohkawara Kakohki Co., Ltd.) under the condition of an inlet temperature of heated gas for drying of 140° C. and an outlet temperature of 65° C., and powder of the vinyl polymer containing silicone polymer (G-1) was obtained. The amount of sulfates contained in the powder of the polymer (G-1) was 2.22 mmol in 100 g of the powder.

In addition, the amount of sulfate compounds used for production of powder of the vinyl polymer containing silicone polymer (G-1) was 2.22 mmol per 100 g of the powder.

Examples 2 to 4

Production of Powder of Vinyl Polymers Containing Silicone Polymers (G-2 to G-4)

The same procedure as in Example 1 was carried out except that the kinds of polyorganosiloxane and emulsifier were adopted as shown in Table 2, and powder of vinyl polymers containing silicone polymers (G-2 to G-4) were obtained.

The amounts of sulfates contained in the powder of the polymers (G-2 to G-4) and the amounts of sulfate compounds used are shown in Table 2.

Note that, "A-500" shown in Table 2 represents a nonion emulsifier manufactured by Kao Corporation (polyoxyethylene distyrenated phenyl ether, trade name "Emulgen A-500").

Example 5

Production of Powder of a Vinyl Polymer Containing Silicone Polymer (G-5)

To a separable flask equipped with a cooling tube, a thermometer, a nitrogen introduction tube, and a stirrer, 115.4 parts of the latex of polyorganosiloxane (S-2) obtained in Production Example 2 (30.0 parts as polyorganosiloxane (S-2)) were introduced. Further, 57.5 parts of deionized water, 39.01 parts of BA, and 0.99 part of AMA were added thereto and mixed.

The inside environment of the separable flask was replaced with nitrogen by introduction of nitrogen and heated to 70° C. When the temperature of the liquid reached 70° C., a mixed liquid of 0.07 part of 4,4'-azobis(4-cyanovaleric acid) (trade name "V-501" manufactured by Wako Pure Chemical Industries, Ltd.) and 5.0 parts of deionized water was added to the liquid and polymerization was started. Subsequently, the liquid temperature was kept at 70° C. for 1 hour and polymerization was completed, and a latex of a composite rubber was obtained.

To the latex of a composite rubber thus obtained, 0.006 part of V-501, 2.0 parts of A-500, and 5.0 parts of deionized water were added. Subsequently, 9.0 parts of AN and 21.0 parts of St, which were monomer components for grafting, were dropped therein at 70° C. over the period of 2 hours. Subsequently, the resulting mixed liquid was kept at 70° C. for 1 hour and polymerization was completed, and a latex of a vinyl polymer containing silicone polymer (G-5) was obtained.

The latex of a vinyl polymer containing silicone polymer (G-5) thus obtained was subjected to spray drying in the same manner as in Example 1 and powder of the vinyl polymer containing silicone polymer (G-5) was obtained.

The amount of sulfates contained in the powder of the polymer (G-5) and the amount of sulfate compounds used are shown in Table 2.

Examples 6 to 13

Production of Powder of Vinyl Polymers Containing Silicone Polymers (G-6 to G-13)

The same procedure as in Example 5 was carried out except that the kinds and amounts of polyorganosiloxane, initiator, and emulsifier were adopted as shown in Table 2, and powder of vinyl polymers containing silicone polymers (G-6 to G-13) were obtained.

The amounts of sulfates contained in the powder of the polymers (G-6 to G-13) and the amounts of sulfate compounds used are shown in Table 2.

Example 14

Production of Powder of a Vinyl Polymer Containing Silicone Polymer (G-14)

To a separable flask equipped with a cooling tube, a thermometer, a nitrogen introduction tube, and a stirrer, 115.4 parts of the latex of polyorganosiloxane (S-3) obtained in Production Example 3 (30.0 parts as polyorganosiloxane (S-3)) were introduced. Further, 57.5 parts of deionized water, 39.01 parts of BA, 0.99 part of AMA, and 0.08 part of CHP were added thereto and mixed.

The inside environment of the separable flask was replaced with nitrogen by introduction of nitrogen and heated to 60° C. When the temperature of the liquid reached 60° C., a mixed liquid of 0.0005 part of Fe, 0.0015 part of EDTA, 0.2 part of sodium formaldehyde sulfoxylate (SFS), and 5.0 parts of deionized water was added to the liquid and polymerization was started. Subsequently, the liquid temperature was kept at 60° C. for 1 hour and polymerization was completed, and a latex of a composite rubber was obtained.

To the latex of a composite rubber thus obtained, 0.25 part of DBSNa and 5.0 parts of deionized water were added. Subsequently, a mixed liquid (monomer components for grafting and an organic peroxide) of 9.0 parts of AN, 21.0 parts of St, and 0.06 part of CHP was dropped therein at 70° C. over the period of 2 hours. Subsequently, the resulting mixed liquid was kept at 70° C. for 1 hour and polymerization was completed, and a latex of a vinyl polymer containing silicone polymer (G-14) was obtained.

The latex of a vinyl polymer containing silicone polymer (G-14) thus obtained was subjected to spray drying in the same manner as in Example 1 and powder of the vinyl polymer containing silicone polymer (G-14) was obtained.

The amount of sulfates contained in the powder of the polymer (G-14) and the amount of sulfate compounds used are shown in Table 2.

TABLE 2

| Vinyl polymer containing a silicone polymer (powder) | | Ex. 1 G-1 | Ex. 2 G-2 | Ex. 3 G-3 | Ex. 4 G-4 | Ex. 5 G-5 | Ex. 6 G-6 | Ex. 7 G-7 | Ex. 8 G-8 |
|---|---|---|---|---|---|---|---|---|---|
| Polyorganosiloxane (solid content) | Kind | S-1 | S-2 | S-2 | S-3 | S-2 | S-2 | S-2 | S-2 |
| | Amount [part] | 30.0 | 30.0 | 30.0 | 30.0 | 30.0 | 30.0 | 30.0 | 30.0 |
| Alkyl(meth)acrylate component and organic peroxide [part] | BA | 39.01 | 39.01 | 39.01 | 39.01 | 39.01 | 39.01 | 39.01 | 39.01 |
| | AMA | 0.99 | 0.99 | 0.99 | 0.99 | 0.99 | 0.99 | 0.99 | 0.99 |
| | CHP | 0.08 | 0.08 | 0.08 | 0.08 | — | — | — | — |
| | tBH | — | — | — | — | — | — | — | — |
| | PV | — | — | — | — | — | — | — | — |
| Azo initiator for alkyl(meth)acrylate component [part] | V-501 | — | — | — | — | 0.07 | — | — | 0.07 |
| | VA-044 | — | — | — | — | — | 0.09 | — | — |
| | VA-057 | — | — | — | — | — | — | 0.09 | — |
| | AIBN | — | — | — | — | — | — | — | — |
| | V-65 | — | — | — | — | — | — | — | — |
| Reducing agent and the like [part] | Fe | 0.0005 | 0.0005 | 0.0005 | 0.0005 | — | — | — | — |
| | EDTA | 0.0015 | 0.0015 | 0.0015 | 0.0015 | — | — | — | — |
| | AH | 0.3 | 0.3 | 0.3 | 0.3 | — | — | — | — |
| | SFS | — | — | — | — | — | — | — | — |
| Emulsifier [part] | DBSNa | 0.25 | 0.25 | — | 0.25 | — | — | — | 0.25 |
| | A-500 | — | — | 2.0 | — | 2.0 | 2.0 | 2.0 | — |
| Azo initiator for monomer component for grafting [part] | V-501 | — | — | — | — | 0.006 | — | — | 0.006 |
| | VA-044 | — | — | — | — | — | 0.006 | — | — |
| | VA-057 | — | — | — | — | — | — | 0.007 | — |
| | AIBN | — | — | — | — | — | — | — | — |
| | V-65 | — | — | — | — | — | — | — | — |
| Monomer component for grafting and organic peroxide [part] | AN | 9.0 | 9.0 | 9.0 | 9.0 | 9.0 | 9.0 | 9.0 | 9.0 |
| | St | 21.0 | 21.0 | 21.0 | 21.0 | 21.0 | 21.0 | 21.0 | 21.0 |
| | MMA | — | — | — | — | — | — | — | — |
| | BA | — | — | — | — | — | — | — | — |
| | CHP | 0.06 | 0.06 | 0.06 | 0.06 | — | — | — | — |
| | tBH | — | — | — | — | — | — | — | — |
| | PV | — | — | — | — | — | — | — | — |
| Amount of sulfates (measured value) [mmol/100 g] | | 2.22 | 2.20 | 2.23 | 2.03 | 1.69 | 1.01 | 1.56 | 1.31 |
| Amount of sulfate compounds to be used [mmol/100 g] | | 2.22 | 1.76 | 1.04 | 1.48 | 1.04 | 1.04 | 1.04 | 1.76 |

| Vinyl polymer containing a silicone polymer (powder) | | Ex. 9 G-9 | Ex. 10 G-10 | Ex. 11 G-11 | Ex. 12 G-12 | Ex. 13 G-13 | Ex. 14 G-14 |
|---|---|---|---|---|---|---|---|
| Polyorganosiloxane (solid content) | Kind | S-2 | S-2 | S-2 | S-6 | S-2 | S-3 |
| | Amount [part] | 30.0 | 30.0 | 30.0 | 30.0 | 30.0 | 30.0 |
| Alkyl(meth)acrylate component and organic peroxide [part] | BA | 39.01 | 39.01 | 39.01 | 39.01 | 39.01 | 39.01 |
| | AMA | 0.99 | 0.99 | 0.99 | 0.99 | 0.99 | 0.99 |
| | CHP | — | — | — | — | — | 0.08 |
| | tBH | — | — | — | — | — | — |
| | PV | — | — | 0.1 | — | — | — |
| Azo initiator for alkyl(meth)acrylate | V-501 | — | — | — | — | — | — |
| | VA-044 | — | — | — | — | — | — |

TABLE 2-continued

| | | | | | | | |
|---|---|---|---|---|---|---|---|
| component [part] | VA-057 | — | — | — | 0.09 | 0.04 | — |
| | AIBN | 0.2 | — | — | — | — | — |
| | V-65 | — | 0.09 | — | — | — | — |
| Reducing agent and the like [part] | Fe | — | — | — | — | — | 0.0005 |
| | EDTA | — | — | — | — | — | 0.0015 |
| | AH | — | — | — | — | — | — |
| | SFS | — | — | — | — | — | 0.2 |
| Emulsifier [part] | DBSNa | — | — | — | — | — | 0.25 |
| | A-500 | 1.0 | 1.0 | 1.0 | 1.0 | 1.0 | — |
| Azo initiator for monomer component for grafting [part] | V-501 | — | — | — | — | — | — |
| | VA-044 | — | — | — | — | — | — |
| | VA-057 | — | — | — | 0.01 | 0.05 | — |
| | AIBN | 0.2 | — | — | — | — | — |
| | V-65 | — | 0.06 | — | — | — | — |
| Monomer component for grafting and organic peroxide [part] | AN | 9.0 | 9.0 | 9.0 | 9.0 | 9.0 | 9.0 |
| | St | 21.0 | 21.0 | 21.0 | 21.0 | 21.0 | 21.0 |
| | MMA | — | — | — | — | — | — |
| | BA | — | — | — | — | — | — |
| | CHP | — | — | — | — | — | 0.06 |
| | tBH | — | — | — | — | — | — |
| | PV | — | — | 0.1 | — | — | — |
| Amount of sulfates (measured value) [mmol/100 g] | | 1.08 | 0.97 | 1.07 | 1.05 | 1.01 | 2.56 |
| Amount of sulfate compounds to be used [mmol/100 g] | | 1.04 | 1.04 | 1.04 | 1.04 | 1.04 | 2.79 |

Note that, abbreviations described in Table 2 are explained below.
tBH: t-butylhydroperoxide
PV: t-butylperoxy pivalate (trade name "Perbutyl PV" manufactured by NOF Corporation)
VA-044: 2, 2'-azobis[2-(2-imidazolin-2-yl)propane]dihydrochloride (trade name "VA-044" manufactured by Wako Pure Chemical Industries, Ltd.)
VA-057: 2, 2'-azobis[N-(2-carboxymethyl)-2-methylpropionamidine]hydrate (trade name "VA-057" manufactured by Wako Pure Chemical Industries, Ltd.)
AIBN: azobisisobutyronitrile
V-65: 2, 2'-azobis(2,4-dimethylvaleronitrile) (trade name "V-65" manufactured by Wako Pure Chemical Industries, Ltd.)
MMA: methyl methacrylate Comparative Examples 1 to 3

Production of Powder of Vinyl Polymers Containing Silicone Polymers (G-15 to G-17)

The same procedure as in Example 14 was carried out except that the kinds of polyorganosiloxane were adopted as shown in Table 3, and powder of vinyl polymers containing silicone polymers (G-15 to G-17) were obtained.

The amounts of sulfates contained in the powder of the polymers (G-15 to G-17) and the amounts of sulfate compounds used are shown in Table 3.

Comparative Example 4

Production of Powder of a Vinyl Polymer Containing Silicone Polymer (G-18)

The same procedure as in Comparative Example 1 was carried out and powder of a vinyl polymer containing silicone polymer (G-18) was obtained.

The latex of a vinyl polymer containing silicone polymer (G-18) thus obtained was dropped in 200 parts of hot water containing 2.5 parts of aluminum sulfate and the latex of a vinyl polymer containing a silicone polymer (G-18) was coagulated. A thus obtained coagulation was separated, washed, and dried at 65° C. for 12 hours, and powder of the vinyl polymer containing silicone polymer (G-18) was obtained.

The amount of sulfates contained in the powder of the polymer (G-18) and the amount of sulfate compounds used are shown in Table 3.

Example 15

Production of Powder of a Vinyl Polymer Containing Silicone Polymer (G-19)

To a separable flask equipped with a cooling tube, a thermometer, a nitrogen introduction tube, and a stirrer, 298.5 parts of the latex of polyorganosiloxane (S-2) obtained in Production Example 2 (80.0 parts as polyorganosiloxane (S-3)) were introduced. Further, 4.8 parts of deionized water and 5.0 part of AMA were added thereto and mixed.

The inside environment of the separable flask was replaced with nitrogen by introduction of nitrogen and heated to 70° C. When the temperature of the liquid reached 70° C., a mixed liquid of 0.06 part of VA-057 and 5.0 parts of deionized water was added to the liquid and polymerization was started. Subsequently, the liquid temperature was kept at 70° C. for 1 hour and polymerization was completed.

Subsequently, 0.6 part of VA-057 and 5.0 parts of deionized water were added to the liquid. Further, a mixed liquid (monomer components for grafting) of 13.5 parts of methyl methacrylate (MMA) and 1.5 parts of BA were dropped therein at 70° C. over the period of 1 hour. Subsequently, the resulting mixed liquid was kept at 70° C. for 1 hour and polymerization was completed, and a latex of a vinyl polymer containing silicone polymer (G-19) was obtained.

The latex of a vinyl polymer containing silicone polymer (G-19) thus obtained was subjected to spray drying in the same manner as in Example 1 and powder of the vinyl polymer containing silicone polymer (G-19) was obtained.

The amount of sulfates contained in the powder of the polymer (G-19) and the amount of sulfate compounds used are shown in Table 3.

Comparative Example 5

Production of Powder of a Vinyl Polymer Containing Silicone Polymer (G-20)

To a separable flask equipped with a cooling tube, a thermometer, a nitrogen introduction tube, and a stirrer, 298.5 parts of the latex of polyorganosiloxane (S-5) obtained in Production Example 5 (80.0 parts as polyorganosiloxane (S-5)) were introduced. Further, 9.8 parts of deionized water, 5.0 part of AMA, and 0.11 part of tBH were added thereto and mixed.

The inside environment of the separable flask was replaced with nitrogen by introduction of nitrogen and heated to 60° C. When the temperature of the liquid reached 60° C., a mixed liquid of 0.0005 part of Fe, 0.0015 part of EDTA, 0.3 part of SFS, and 5.0 parts of deionized water was added to the liquid and polymerization was started. Subsequently, the liquid temperature was kept at 60° C. for 1 hour and polymerization was completed.

Subsequently, a mixed liquid of 13.5 parts of MMA, 1.5 parts of BA, and 0.16 part of tBH (monomer components for grafting and an organic peroxide) was dropped therein at 70° C. over the period of 1 hours. Subsequently, the resulting mixed liquid was kept at 70° C. for 1 hour and polymerization was completed, and a latex of a vinyl polymer containing silicone polymer (G-20) was obtained.

The latex of a vinyl polymer containing silicone polymer (G-20) thus obtained was subjected to spray drying in the same manner as in Example 1 and powder of the vinyl polymer containing silicone polymer (G-20) was obtained.

The amount of sulfates contained in the powder of the polymer (G-20) and the amount of sulfate compounds used are shown in Table 3.

Example 16

Production of Powder of a Vinyl Polymer Containing Silicone Polymer (G-21)

To a separable flask equipped with a cooling tube, a thermometer, a nitrogen introduction tube, and a stirrer, 299.6 parts of the latex of polyorganosiloxane (S-7) obtained in Production Example 7 (80.0 parts as polyorganosiloxane (S-7)) were introduced. Further, 2.4 parts of deionized water were added thereto and mixed.

The inside environment of the separable flask was replaced with nitrogen by introduction of nitrogen and heated to 70° C. When the temperature of the liquid reached 70° C., a mixed liquid of 0.1 part of V-501 and 5.0 parts of deionized water was added to the liquid and a mixed liquid (monomer components for grafting) of 19.5 parts of MMA and 0.5 part of BA was dropped therein over the period of 1 hour. Subsequently, the resulting mixed liquid was kept at 70° C. for 1 hour and polymerization was completed, and a latex of a vinyl polymer containing silicone polymer (G-21) was obtained.

The latex of a vinyl polymer containing silicone polymer (G-21) thus obtained was subjected to spray drying in the same manner as in Example 1 and powder of the vinyl polymer containing silicone polymer (G-21) was obtained.

The amount of sulfates contained in the powder of the polymer (G-21) and the amount of sulfate compounds used are shown in Table 3.

Comparative Example 6

Production of Powder of a Vinyl Polymer Containing Silicone Polymer (G-22)

To a separable flask equipped with a cooling tube, a thermometer, a nitrogen introduction tube, and a stirrer, 299.6 parts of the latex of polyorganosiloxane (S-5) obtained in Production Example 5 (80.0 parts as polyorganosiloxane (S-5)) were introduced. Further, 2.4 parts of deionized water were added thereto and mixed.

The inside environment of the separable flask was replaced with nitrogen by introduction of nitrogen and heated to 60° C. When the temperature of the liquid reached 60° C., a mixed liquid of 0.001 part of Fe, 0.003 part of EDTA, 0.24 part of SFS, and 5.0 parts of deionized water was added to the liquid. Subsequently, a mixed liquid (monomer components for grafting and an organic peroxide) of 19.5 parts of MMA, 0.5 part of BA, and 0.2 part of CHP was dropped therein at 60° C. over the period of 1 hour. Subsequently, the resulting mixed liquid was kept at 60° C. for 1 hour and polymerization was completed, and a latex of a vinyl polymer containing silicone polymer (G-22) was obtained.

The latex of a vinyl polymer containing silicone polymer (G-22) thus obtained was subjected to spray drying in the same manner as in Example 1 and powder of the vinyl polymer containing silicone polymer (G-22) was obtained.

The amount of sulfates contained in the powder of the polymer (G-22) and the amount of sulfate compounds used are shown in Table 3.

TABLE 3

| Vinyl polymer containing a silicone polymer (powder) | | Comp. Ex. 1 G-15 | Comp. Ex. 2 G-16 | Comp. Ex. 3 G-17 | Comp. Ex. 4 G-18 | Ex. 15 G-19 | Comp. Ex. 5 G-20 | Ex. 16 G-21 | Comp. Ex. 6 G-22 |
|---|---|---|---|---|---|---|---|---|---|
| Polyorganosiloxane (solid content) | Kind | S-2 | S-4 | S-5 | S-2 | S-2 | S-5 | S-7 | S-5 |
|  | Amount [part] | 30.0 | 30.0 | 30.0 | 30.0 | 80.0 | 80.0 | 80.0 | 80.0 |
| Alkyl(meth)acrylate component and organic peroxide [part] | BA | 39.01 | 39.01 | 39.01 | 39.01 | — | — | — | — |
|  | AMA | 0.99 | 0.99 | 0.99 | 0.99 | 5.0 | 5.0 | — | — |
|  | CHP | 0.08 | 0.08 | 0.08 | 0.08 | — | — | — | — |
|  | tBH | — | — | — | — | — | 0.11 | — | — |
|  | PV | — | — | — | — | — | — | — | — |
| Azo initiator for alkyl(meth)acrylate component [part] | V-501 | — | — | — | — | — | — | — | — |
|  | VA-044 | — | — | — | — | — | — | — | — |
|  | VA-057 | — | — | — | — | 0.06 | — | — | — |
|  | AIBN | — | — | — | — | — | — | — | — |
|  | V-65 | — | — | — | — | — | — | — | — |
| Reducing agent and the like [part] | Fe | 0.0005 | 0.0005 | 0.0005 | 0.0005 | — | 0.0005 | — | 0.001 |
|  | EDTA | 0.0015 | 0.0015 | 0.0015 | 0.0015 | — | 0.0015 | — | 0.003 |
|  | AH | — | — | — | — | — | — | — | — |
|  | SFS | 0.2 | 0.2 | 0.2 | 0.2 | — | 0.3 | — | 0.24 |
| Emulsifier [part] | DBSNa | 0.25 | 0.25 | 0.25 | 0.25 | — | — | — | — |
|  | A-500 | — | — | — | — | — | — | — | — |
| Azo initiator for monomer component for | V-501 | — | — | — | — | — | — | 0.1 | — |
|  | VA-044 | — | — | — | — | — | — | — | — |
|  | VA-057 | — | — | — | — | 0.6 | — | — | — |

TABLE 3-continued

| Vinyl polymer containing a silicone polymer (powder) | | Comp. Ex. 1 G-15 | Comp. Ex. 2 G-16 | Comp. Ex. 3 G-17 | Comp. Ex. 4 G-18 | Ex. 15 G-19 | Comp. Ex. 5 G-20 | Ex. 16 G-21 | Comp. Ex. 6 G-22 |
|---|---|---|---|---|---|---|---|---|---|
| grafting [part] | AIBN | — | — | — | — | — | — | — | — |
|  | V-65 | — | — | — | — | — | — | — | — |
| Monomer | AN | 9.0 | 9.0 | 9.0 | 9.0 | — | — | — | — |
| component for | St | 21.0 | 21.0 | 21.0 | 21.0 | — | — | — | — |
| grafting and | MMA | — | — | — | — | 13.5 | 13.5 | 19.5 | 19.5 |
| organic peroxide | BA | — | — | — | — | 1.5 | 1.5 | 0.5 | 0.5 |
| [part] | CHP | 0.06 | 0.06 | 0.06 | 0.06 | — | — | — | 0.2 |
|  | tBH | — | — | — | — | — | 0.16 | — | — |
|  | PV | — | — | — | — | — | — | — | — |
| Amount of sulfates (measured value) [mmol/100 g] | | 3.16 | 3.97 | 3.11 | 0.38 | 1.23 | 5.03 | 0.21 | 4.86 |
| Amount of sulfate compounds to be used [mmol/100 g] | | 3.06 | 3.52 | 3.22 | 3.06 | 2.77 | 5.15 | 0.49 | 4.75 |

Examples 17 to 29, Comparative Examples 7 to 11

Powder of a vinyl polymer containing a silicone polymer and PC resin (trade name "Iupilon S-2000F" manufactured by Mitsubishi Engineering-Plastics Corporation; viscosity average molecular weight of 24,000) were blended in a ratio as shown in Tables 4 and 5. The blend was melt mixed by use of a 30 mmϕ twin-screw extruder (L/D being 30) at a cylinder temperature of 280° C. and a screw rotational frequency of 200 rpm, and a thermoplastic resin composition was obtained. Subsequently, the thermoplastic resin composition was shaped into pellets.

Thus obtained pellets were dried at 80° C. for 12 hours and then supplied to a 100 t injection molding machine (trade name "SE-100DU" manufactured by Sumitomo Heavy Industry, Ltd.) and subjected to injection molding at a cylinder temperature of 280° C. and a mold temperature of 80° C. Test pieces (having notches) for Charpy impact test were obtained in accordance with JIS K7152 by use of a family mold. The results of various evaluations by use of these pellets and test pieces are shown in Tables 4 and 5.

TABLE 4

| | | | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|---|---|
| Vinyl polymer containing a silicone polymer (powder) | | Kind | G-1 | G-2 | G-3 | G-4 | G-5 | G-6 | G-7 | G-8 | G-9 | G-10 | G-11 | G-14 |
| | | Amount [part] | 5 | 5 | 5 | 5 | 5 | 5 | 5 | 5 | 5 | 5 | 5 | 5 |
| PC resin | | Amount [part] | 95 | 95 | 95 | 95 | 95 | 95 | 95 | 95 | 95 | 95 | 95 | 95 |
| MFR | | [g/10 minutes] | 11.5 | 12.7 | 12.7 | 12.1 | 11.5 | 11.3 | 15.7 | 11.7 | 10.7 | 11.3 | 10.8 | 18.5 |
| Hydrolysis resistance | ΔMFR | [%] | 17.1 | 11.3 | 11.3 | 8.5 | 13.0 | 17.9 | 12.6 | 9.7 | 6.1 | 11.3 | 12.3 | 0 |
| Thermal stability | ΔMFR | [%] | 46.0 | 48.1 | 45.3 | 34.1 | 19.3 | 39.8 | 45.6 | 32.6 | 35.3 | 42.3 | 27.6 | 99.1 |
| | Coloring by heat | — | ○ | ○ | ○ | ○ | ○ | ○ | ○ | ○ | ○ | ○ | ○ | x |
| Charpy impact strength | −30° C. | [kJ/m²] | 42.2 | 43.0 | 43.0 | 42.8 | 45.6 | 45.4 | 45.6 | 45.5 | 54.3 | 42.2 | 44.2 | 33.2 |
| | 23° C. | [kJ/m²] | 53.0 | 53.5 | 53.5 | 53.6 | 57.4 | 59.6 | 55.6 | 56.8 | 63.4 | 52.5 | 53.1 | 47.6 |

| | | | Comp. Ex. 7 | Comp. Ex. 8 | Comp. Ex. 9 | Comp. Ex. 10 |
|---|---|---|---|---|---|---|
| Vinyl polymer containing a silicone polymer (powder) | | Kind | — | G-15 | G-16 | G-18 |
| | | Amount [part] | 0 | 5 | 5 | 5 |
| PC resin | | Amount [part] | 100 | 95 | 95 | 95 |
| MFR | | [g/10 minutes] | 12.0 | 18.4 | 19.1 | 10.6 |
| Hydrolysis resistance | ΔMFR | [%] | 10.1 | 19.9 | 216 | Not measurable |
| Thermal stability | ΔMFR | [%] | 0.3 | 157 | 91.8 | Not measurable |
| | Coloring by heat | — | ○ | x | x | x |
| Charpy impact strength | −30° C. | [kJ/m²] | 15.6 | 30.0 | 30.5 | 20.0 |
| | 23° C. | [kJ/m²] | 72.2 | 44.1 | 45.4 | 50.0 |

TABLE 5

|  |  | | Ex. 29 | Comp. Ex. 11 |
|---|---|---|---|---|
| Vinyl polymer containing a silicone polymer (powder) | Kind | | G-19 | G-20 |
| | Amount | [part] | 5 | 5 |
| PC resin | Amount | [part] | 95 | 95 |
| MFR | | [g/10 minutes] | 18.5 | 17.6 |
| Hydrolysis resistance | ΔMFR | [%] | 27.1 | 62.5 |
| Thermal stability | ΔMFR | [%] | 29.2 | 27.2 |
| | Coloring by heat | | ○ | X |
| Charpy impact strength | −30° C. | [kJ/m²] | 46.3 | 48.4 |
| | 23° C. | [kJ/m²] | 52.6 | 51.9 |

Example 30, Comparative Example 12

Powder of a vinyl polymer containing a silicone polymer, PC resin (trade name "Iupilon S-2000F" manufactured by Mitsubishi Engineering-Plastics Corporation; viscosity average molecular weight of 24,000), and an AS resin (trade name "AP-H" manufactured by UMG ABS Ltd.) were blended in a ratio as shown in Table 6. The blend was melt mixed by use of a 30 mmφ twin-screw extruder (L/D being 30) at a cylinder temperature of 260° C. and a screw rotational frequency of 200 rpm, and a thermoplastic resin composition was obtained. Subsequently, the thermoplastic resin composition was shaped into pellets.

Thus obtained pellets were dried at 80° C. for 12 hours and then supplied to the 100 t injection molding machine (trade name "SE-100DU" manufactured by Sumitomo Heavy Industry, Ltd.) and subjected to injection molding at a cylinder temperature of 260° C. and a mold temperature of 80° C. Test pieces (having notches) for Charpy impact test were obtained in accordance with JIS K7152 by use of a family mold. The results of various evaluations by use of these pellets and test pieces are shown in Tables 6.

TABLE 6

|  |  | | Ex. 30 | Comp. Ex. 12 |
|---|---|---|---|---|
| Vinyl polymer containing a silicone polymer (powder) | Kind | | G-13 | G-17 |
| | Amount | [part] | 10 | 10 |
| PC resin | Amount | [part] | 70 | 70 |
| As resin | Amount | [part] | 20 | 20 |
| MFR | | [g/10 minutes] | 6.6 | 6.3 |
| Hydrolysis resistance | ΔMFR | [%] | — | — |
| Thermal stability | ΔMFR | [%] | 21.1 | 37.2 |
| | Coloring by heat | | ○ | X |
| Charpy impact strength | −30° C. | [kJ/m²] | 21.6 | 17.6 |
| | 23° C. | [kJ/m²] | 56.4 | 50.3 |

Example 31, Comparative Examples 13 and 14

Powder of a vinyl polymer containing a silicone polymer, a bisphenol A epoxy resin (trade name "Adeka Resin EP-4100E" manufactured by Adeka Corporation), and a tetrahydromethyl phthalic anhydride (trade name "Adeka Hardner EH-3326" manufactured by Adeka Corporation) were blended in a ratio as shown in Table 7 and kneaded with three rolls, and a rein composition was obtained. Subsequently, 0.5 part of N-benzyl-2-methylimidazol was added thereto, and the resulting mixture was further stirred and mixed, and a thermoplastic resin composition was obtained.

A thus obtained thermoplastic resin composition was packed in a glass cell and heated at 80° C. for 2 hours and at 120° C. for 6 hours, and thus cured and a sheet shaped article having a thickness of 3 mm was obtained. The sheet shaped article was cut into test pieces for various tests.

Various evaluations by use of the sheet shaped article are shown in Table 7.

TABLE 7

|  |  | Ex. 31 | Comp. Ex. 13 | Comp. Ex. 14 |
|---|---|---|---|---|
| Vinyl polymer containing a silicone polymer (powder) | Kind | G-21 | — | G-22 |
| | Amount [part] | 5.1 | — | 5.1 |
| Epoxy resin | Amount [part] | 51 | 53.8 | 51 |
| Tetrahydromethyl phthalic anhydride | Amount [part] | 43.4 | 45.7 | 43.4 |
| N-benzyl-2-methylimidazole | Amount [part] | 0.5 | 0.5 | 0.5 |
| Izod impact strength | [J/m] | 31.8 | 11.8 | 30.5 |
| Coefficient of water absorption | [%] | 0.150 | 0.148 | 0.207 |
| Electric characteristics 1 MHz | Dielectric constant | 3.16 | 3.18 | 3.21 |
| | Dielectric loss tangent | 0.014 | 0.014 | 0.014 |
| 1 GHz | Dielectric constant | 2.92 | 2.93 | 2.94 |
| | Dielectric loss tangent | 0.010 | 0.010 | 0.013 |
| Flame retardancy (number of test pieces which generated flaming droplets) | | 0 | 5 | 0 |

It is obvious from Table 4 that the thermoplastic resin compositions in Examples 17 to 28 were good in Charpy impact strength at −30° C. as compared with the thermoplastic resin composition in Comparative Example 7.

The thermoplastic resin compositions in Examples 17 to 28 had smaller rate of increase of MFR after the heat-moisture treatment and thus had better hydrolysis resistance in comparison with those in Comparative Examples 8 to 10. In addition, they had good thermal stability and coloring of each strand after 30 minutes of the retention was almost not observed. They were good in Charpy impact strength, in particular, in Charpy impact strength at −30° C.

The thermoplastic resin composition in Comparative Example 10 is the one in which powder recovered by coagulation of the latex of a vinyl polymer containing silicone polymer (G-18) by use of aluminum sulfate is blended. The rate of increase of MFR after the heat-moisture treatment was considerably large and thus ΔMFR could not be measured. In addition, the thermal stability was low and thus ΔMFR could not be measured.

It is obvious from Table 5 that the thermoplastic resin composition in Example 29 was good in hydrolysis resistance as compared with that in Comparative Example 7. In addition, it had good thermal stability and coloring of the strand after 30 minutes of the retention was almost not observed.

It is obvious from Table 6 that the thermoplastic resin composition in Example 30 had good thermal stability as compared with that in Comparative Example 12 and coloring of the strand after 30 minutes of the retention was almost not observed, though they had almost the same Charpy impact strength.

It is obvious from Table 7 that the thermoplastic resin composition in Example 31 was good in Izod impact strength and flame retardancy as compared with that in Comparative Example 13. In addition, the thermoplastic resin composition in Example 31 was good in coefficient of water absorption and electric characteristics as compared with that in Comparative Example 14, though they had almost the same Izod impact strength and flame retardancy.

The present application claims the priority of Japanese Patent Application No. 2008-221994 filed at the Japan Patent Office on Aug. 29, 2008, Japanese Patent Application No. 2008-267633 filed at the Japan Patent Office on Oct. 16, 2008, and Japanese Patent Application No. 2009-141602 filed at the Japan Patent Office on Jun. 12, 2009, the contents of which are incorporated herein by reference.

As mentioned above, the present invention has been explained by reference to embodiments (and examples), but the present invention is not limited to those embodiments (and examples). Various changes or modifications can be made by a person skilled in the art within the scope of the present invention.

What is claimed is:

1. A method for producing a spray-dried powder comprising:
   (1) polymerizing a composition of a vinyl monomer in the presence of a latex of a silicone polymer to produce a latex composition of vinyl polymer and silicone polymer, and
   (2) spray-drying the latex composition to form a spray-dried powder,
   wherein the components of the polymerizing composition of the vinyl monomer in the presence of the latex of the silicone polymer and the polymerizing conditions are controlled so to limit the "sulfate" content of the spray-dried powder, defined as the content of sulfates, sulfonates, and sulfinates in mmol/100 g of the powder, to 0.02 to 2.5 mmol/100 g of the powder.

2. The method according to claim 1, wherein the silicone polymer comprises a polyorganosiloxane having a toluene insoluble content of 20% by mass or more.

3. The method according to claim 1, wherein the silicone polymer comprises a polyorganosiloxane having a mass average molecular weight of 15,000 or more.

4. The method according to claim 1, wherein the silicone polymer comprises a polyorganosiloxane and a polyalkyl (meth)acrylate.

5. The method according to claim 1, wherein the polymerization is conducted with at least one polymerization initiator selected from the group consisting of a peroxide, an organic peroxide, and an azo initiator.

6. A powder obtained by the method according to claim 1.

7. A resin composition, comprising:
   a powder of claim 6 and a resin.

8. A shaped article obtained by shaping the resin composition of claim 7.

9. The method for producing a spray-dried powder according to claim 1, wherein the components of the polymerizable composition of the vinyl monomer in the presence of the latex of the silicone polymer and the polymerizing conditions are controlled so to limit the "sulfate" content of the spray-dried powder to 0.1 to 2.5 mmol per 100 g of the powder.

10. The method according to claim 1, wherein the silicone polymer is a silicone polymer having a polymerizable vinyl functional group.

11. The method according to claim 1, wherein the silicone polymer contains an anionic emulsifier.

12. The method according to claim 11, wherein the silicone polymer contains an acid catalyst.

13. The method according to claim 1, wherein the silicone polymer contains a nonionic emulsifier.

14. The method according to claim 1, wherein the vinyl monomer is at least one selected from the group consisting of a (meth)acrylate monomer, an aromatic vinyl monomer, and a vinyl cyanide monomer.

15. The method according to claim 1, wherein the silicone polymer comprises a polyorganosiloxane having a mass average molecular weight of 50,000 to 500,000.

16. The method according to claim 1, wherein the spray-drying temperature is 120 to 200° C.

17. A resin composition according to claim 7, which comprises 0.5 to 45% by mass of the spray-dried powder.

* * * * *